United States Patent [19]

Heed

[11] Patent Number: 5,676,171
[45] Date of Patent: Oct. 14, 1997

[54] DEVICE FOR FLUID BLOCKING IN A PIPE LINE

[75] Inventor: Kai Heed, Söderköping, Sweden

[73] Assignee: Anne Wikengard-Heed, Sweden

[21] Appl. No.: 545,740

[22] PCT Filed: May 9, 1994

[86] PCT No.: PCT/SE94/00429

§ 371 Date: Jan. 4, 1996

§ 102(e) Date: Jan. 4, 1996

[87] PCT Pub. No.: WO94/27081

PCT Pub. Date: Nov. 24, 1994

[30] Foreign Application Priority Data

May 7, 1993 [SE] Sweden ................... 9301607

[51] Int. Cl.$^6$ .................. F16K 13/08; F16L 41/04; F16L 55/128
[52] U.S. Cl. .................. 137/318; 138/94; 138/97; 251/250
[58] Field of Search ................... 137/318; 138/94, 138/89, 97; 74/30, 89.17; 251/250

[56] References Cited

U.S. PATENT DOCUMENTS

| | | | |
|---|---|---|---|
| 1,885,896 | 11/1932 | Carr et al. | 138/94 |
| 2,285,392 | 6/1942 | Cline | 138/94 |
| 2,285,779 | 6/1942 | Mueller et al. | 138/94 |
| 2,385,017 | 9/1945 | Mercier | 137/318 |
| 2,482,696 | 9/1949 | Smith et al. | 138/94 |
| 2,763,282 | 9/1956 | Reedy et al. | 137/318 |
| 2,899,983 | 8/1959 | Farris | 137/318 |
| 3,115,163 | 12/1963 | Van Epps et al. | 138/94 |
| 3,799,182 | 3/1974 | Long | 137/318 |
| 3,821,965 | 7/1974 | Reynolds | 137/318 |
| 4,648,422 | 3/1987 | Amblard | 137/318 |
| 5,316,037 | 5/1994 | Martin | 137/318 |

FOREIGN PATENT DOCUMENTS

0 027 027 A1   4/1981   European Pat. Off. .

Primary Examiner—George L. Walton
Attorney, Agent, or Firm—Lerner, David, Littenberg, Krumholz & Mentlik

[57] ABSTRACT

The invention relates to a device for blocking a flow in a pipeline under pressure, comprising a clamp member (1) for encasing a section of the mantle surface of the pipeline and comprising a pipe socket (2) with a valve (17), switchable between an open and a closed position, and a hole-making tool (3) for producing a hole (56) in the mantle surface during sealing between the tool and the pipe socket. A blocking means (4) is adapted to be inserted through the produced hole and to expand in the pipeline for the purpose of blocking the flow in the pipeline. The blocking means consists of a body with a cross-sectional dimension which is less than the cross-sectional dimension of the hole, and a support member being guided in the pipe socket. Two sliding elements, which are carried by the body, are via the support member adjustable from the outside between an open position in which it is retracted into the body, and an expanded blocking position, in which it seals against the inner circumference of the pipeline.

16 Claims, 8 Drawing Sheets

DEVICE FOR FLUID BLOCKING IN A PIPE LINE

TECHNICAL FIELD

The present invention relates to a device for blocking flow in a pipeline in accordance with the preamble of the subsequent claim 1.

BACKGROUND OF THE INVENTION

It is known from for example SE 8605201-1 to arrange a blocking in a pipeline which is under pressure. This known device comprises a bladder which is caused to expand in the pipeline by means of compressed air. This device has a natural upper limit regarding applications in pipelines with large dimensions and high levels of pressure.

SUMMARY OF THE INVENTION

The object of the present invention is to provide a blocking device which may be applied to pipelines with small as well as large pipeline dimensions, and low as well as high fluid pressures.

Said object is obtained by means of a device in accordance with the present invention, the features of which will be apparent from the subsequent claim 1.

BRIEF DESCRIPTION OF THE DRAWINGS

The invention will now be described with certain embodiments, with reference to the annexed drawings, in which FIG. 8 shows a corresponding view of the blocking means in the form of a cross-section along the line VIII—VIII in FIG. 6, showing a blocking position, whereas

DETAILED DESCRIPTION OF PREFERRED EMBODIMENTS

Figure 1:
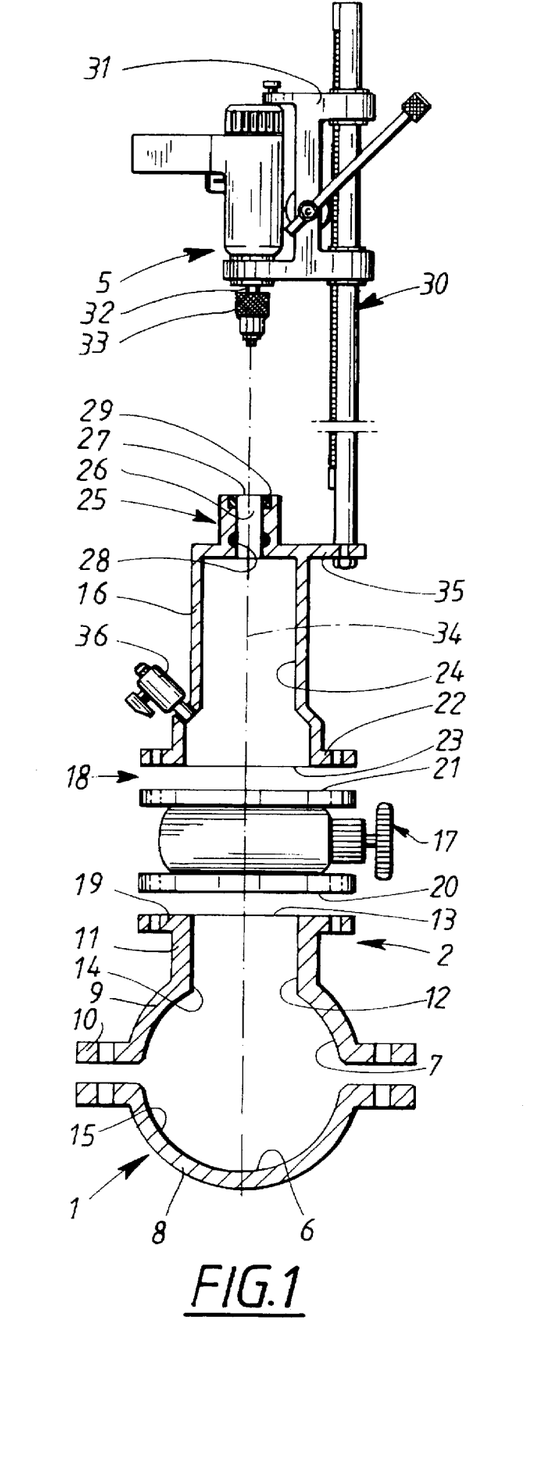
FIGS. 1, 2 and 3 show partly sectioned views of components forming part of the device according to the invention, according to a first embodiment.
Figure 2:
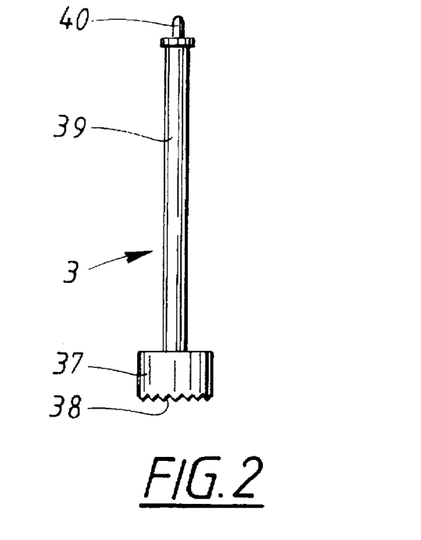
Figure 3:
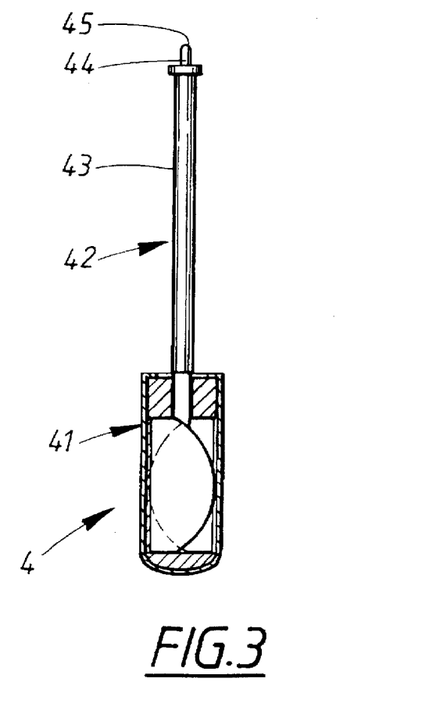

The main components of the blocking device, which thus are shown in a first embodiment in FIGS. 1 to 3, are a clamp member 1 including a pipe socket 2, a hole-making tool 3, a blocking means 4 and a driving device 5 for the hole-making tool as well as the blocking device. The clamp member has inner surfaces 6, 7 of cylinder-jacket shape, adapted for sealingly surrounding a section of the pipeline, the fluid of which is to be blocked. In order to accomplish this without having to screw the clamp member on from either end of the pipeline, the clamp member is divided into two roughly halfcylinder-shaped parts 8, 9 with flanges 10 intended to be joined to each other by means of screws (see FIG. 4) and thus pressing against the outer mantle surface of the pipeline. The pipe socket 2 comprises an inner part 11 which is integrated with the clamp member 1, or more precisely its first part 9, so that the inner part 11 presents a through-duct 12 with an opening 13 outwardly from the clamp member and an opening 14 inwardly towards the space 15 delimited by the clamp member.

The pipe socket 2 is divided into the inner part 11 and an outer part 16 which is releasably attachable to the inner part 11 with a closing valve 17 interpositioned in the partition location 18 of the inner and outer parts of the pipe socket. In this respect, the inner part 11 is provided with a flange 19 around the opening 13, for sealingly fitting to one flange 20 of the closing valve 17, whereas the other flange 21 of the closing valve is intended for sealingly mounting of the outer part 16 of the pipe socket, more precisely at a flange 22 which surrounds an inner opening 23 of the part 16. The outer part 16 of the pipe socket also presents a through-duct 24, which at its outer end 25 has a tapered duct 26 with an opening 27. The outer part 16 comprises sealing means in the duct 26 which, in the shown example, is an inner ring-shaped seal 28 and an outer ring-shaped seal 29 for sealingly fitting to parts of the hole-making tool 3 and also the blocking means 4, which will be explained in greater detail below.

The outer part 16 of the pipe socket carries a support 30 for the driving device 5, which in the shown example is a hand tool of the drilling machine type, fitted in the support and displaceably supported by a holding member 31, which in a conventional manner may be adjusted between different vertical positions by means of a rack and pinion device. The driving device comprises an outgoing rotatable driving shaft 32 with a chuck 33 for a rotatably fixed drive mounting of the hole-making tool 3 and the blocking means 4, respectively. The driving shaft 32 of the driving device 5 is mounted coaxially in relation to the symmetric longitudinal axle 34 of the blocking device. The support 30 is in the shown example at its lower end firmly attached to a flange 35, which is laterally directed and protrudes from the outer part 16 of the pipe socket.

At the lower section of the outer part 16 of the pipe socket 2 there is arranged a flushing valve 36 which, at certain occasions, is intended to be opened in order to relieve the pressure on the outer part for dismounting.

The hole-making tool 3 consists of a drill bit 37 with circularly located sawteeth 38 for making a circular hole with a diameter which slightly exceeds the diameter of the blocking means 4. The drill bit 37 is arranged on a long drive shaft 39 of such a length that the upper end 40 of the drive shaft may be fixed in the chuck 33 and the drive shaft may extend through the pipe socket 2 and, together with the drill bit, produce a hole 41 in the pipeline 42, see FIG. 4. The drive shaft 39 may either be a unit, so that the hole-making tool 3 rotates as one piece by means of the driving device 5, or alternatively the drive shaft may be mounted in a shaft sleeve, which essentially does not rotate with the shaft, thereby sparing the sealings 28, 29.

Figure 7:
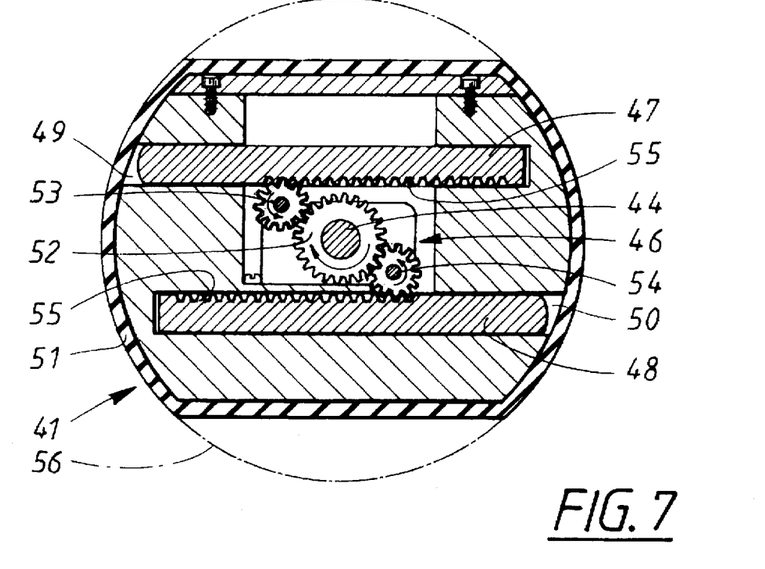
FIG. 7 shows a cross-section on a larger scale of the blocking means along the line VII—VII in FIG. 5, the blocking means being shown in an open position.
Figure 8:
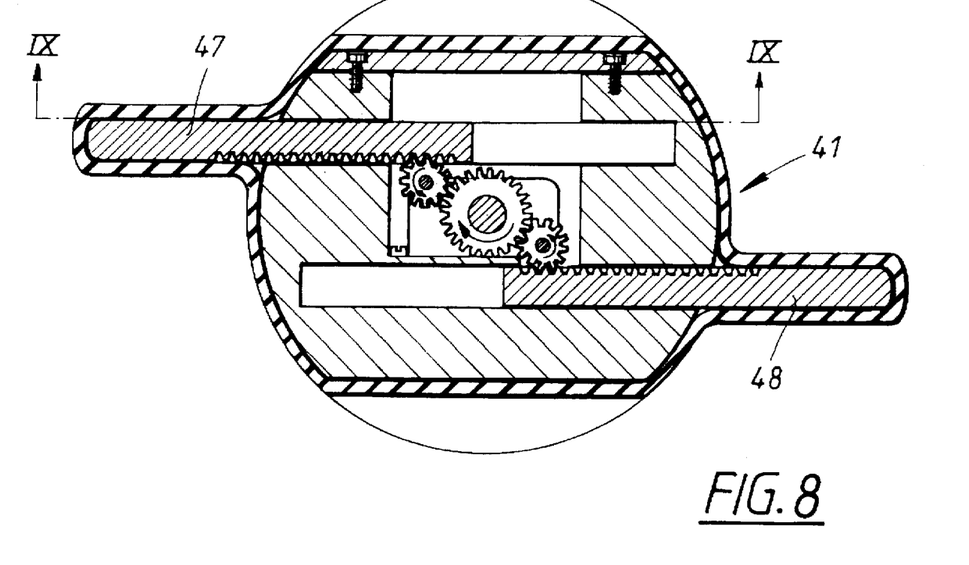
Figure 9:
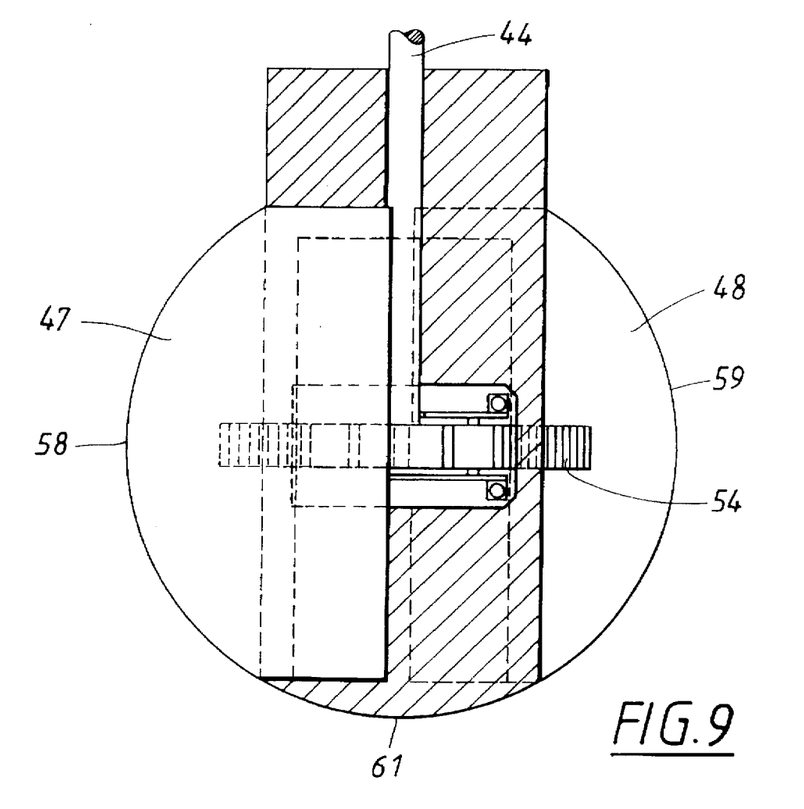
FIG. 9 shows a cross-section of the device along the line IX—IX in FIG. 8.

The blocking means 4 is shown in its entirety in FIG. 3, and in greater detail in FIGS. 7, 8 and 9. At its lower part, the blocking means 4 consists of a body which is intended to be inserted through a hole in the pipeline, which will be described in greater detail below. A support member 42 extends from the body and also forms an operating part for the operation of the blocking means. The support part 42 comprises a shaft sleeve 43 which is rotatably fixed to the body 41, through which sleeve an operating through-shaft 44 extends, the upper end 45 of which is adapted to be fastened in the chuck 33 of the driving device 5. The operating shaft 44 extends down into the body 41 and is adapted to transmit, via a transmission gear 46, a rotary motion of the operating shaft 44 to a reciprocating motion of two blocking sliding elements 47, 48 which are guided in two slit-shaped cavities 49, 50, respectively, in the body 41. In the shown example, the body is surrounded by an elastic cover 51 of rubber or similar, which sealingly surrounds the body as a whole but which is formed of a material which is flexible and highly ductile so that the cover allows a protruding motion of the two sliding elements 47, 48, which is shown in FIG. 8. In the shown example, the transmission gear 46 is formed by a gear 52 on the operating shaft 44 and two smaller gears 53, 54 for gear reduction of the motion, and a gear rack 55 on the inside of each one of the sliding elements 47, 48. The gears 53, 54 mesh with the gear 52 and also with both of the rack gears. As is apparent from FIGS. 7 and 8, rotation in the direction of the arrows leads to a linear protruding motion of the two sliding elements.

Regarding the contour shape of the blocking means, it is apparent from FIGS. 7 and 8 that the cross-section shape of the body 41, i.e. in a cross-section across the longitudinal axle of the operating shaft 44, i.e. in one of its radial planes, comprises an outer contour which is surrounded by a circle which corresponds to the diameter of the drill bit, i.e. diameter of the produced hole 56. The circumference of the produced hole is indicated by a dot-dash line 56 in FIG. 7. In practice, the diameter of the hole is of course chosen with a certain clearance in relation to the diameter of the body.

Figure 4:
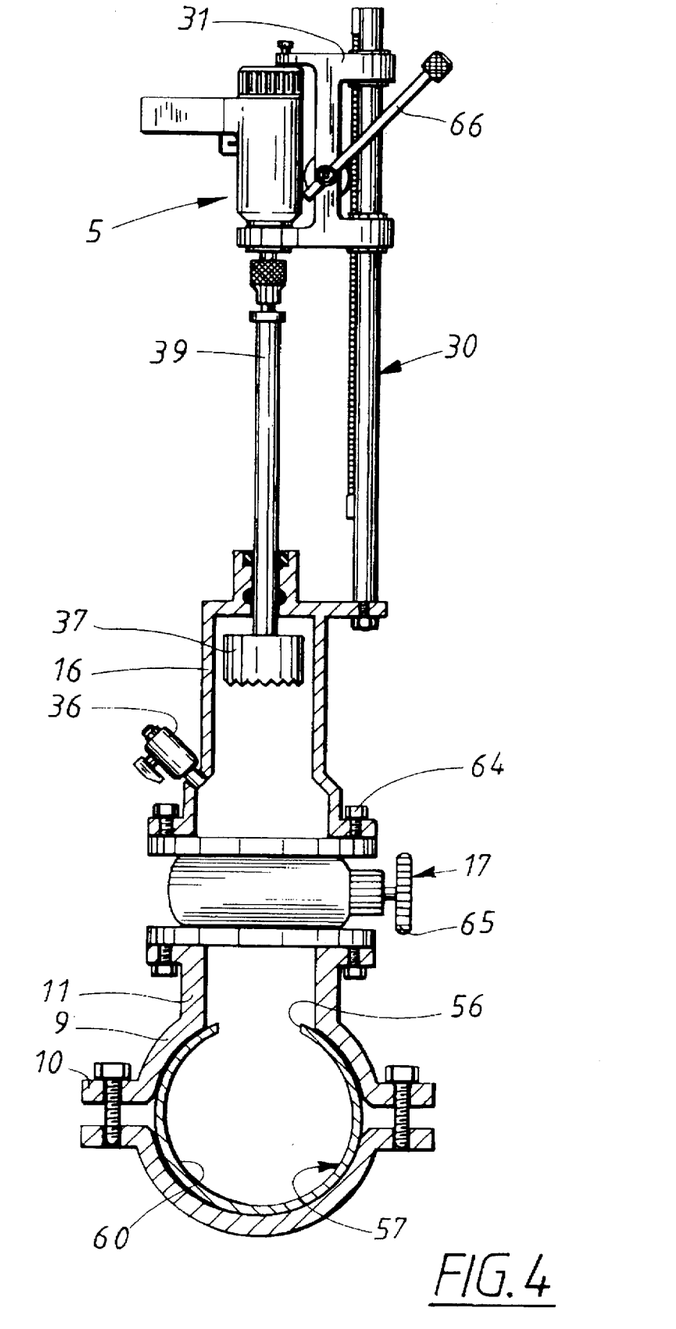
FIG. 4 shows a cross-section of the device in a hole-making stage.

As is apparent from FIG. 4, the sliding elements 47, 48 comprise arc-shaped outer edges 58, 59 with a radius of curvature which corresponds to the radius of curvature of the inner circumference 60 of the pipeline 57 in question. Furthermore, in its lower end 61 the body 41 comprises a cylinder mantle shape which follows this contour shape and which is rounded off so that in the protruding, expanded positions of the sliding elements shown in FIG. 9, the body together with the sliding elements completely fill the cross-section of the pipeline, thereby blocking the flow through the pipeline. By means of the elastic cover 51, a good contact with the inner circumference of the pipeline is obtained by adapting to minor irregularities and deviations from the ideal shape.

The blocking device according to the invention which is described above is used in the following manner, for blocking of fluid, i.e. a liquid or a gas, in a pipeline under pressure. Demand for blocking under pressure may exist for various situations, such as accidents, for example a fracture of the pipeline, or during construction work where also certain closing valves are concerned so that a blocking must be made upstream of the first valve. At the section where a blocking must be carried out, the clamp 1 is mounted, the two parts 8, 9 of which are connected from opposite directions by means of a screw joint 62 through the flange holes 63. Advantageously, the part 9 is provided with some kind of sealing section in the area around the inner opening 14 of the pipe socket 2, which may be accomplished by means of a sealing layer in the mantle surface or alternatively in the form of a sealing ring around the opening. Thereafter, the closing valve 17 is mounted, which for example may be a sliding valve, a ball valve or the like. Since one part 9 of the clamp 1, the inner part 11 of the pipe socket 2 and the closing valve 17 are always intended to be firmly connected to one another, the closing valve may be mounted from the start, which may involve a gain in time.

The next step is the hole-making operation. To this end, the hole-making tool 3 is inserted from below in the outer part 16 of the pipe socket, which in this regard stands free from the closing valve 17 and for example lies so that the driving shaft 39 may be inserted from inside through the duct 26 and with its end 40 may be rotatably fixed to the chuck 33 of the driving device. In this regard, provision must be made for the driving device to be in such a withdrawn position, see FIG. 4, that the drill bit 37 is withdrawn into the upper, outer part 16 of the pipe socket. Thereafter, the upper part 16 of the pipe socket 2 is mounted to the closing valve 17, flange against flange, by means of a screw joint 64. Between the flanges of the valve and the inner and outer parts, respectively, of the pipe socket there are arranged washers in order to obtain a proper sealing. In this regard, the closing valve 17 must be maintained open by operating its operating means 65, in the shown example by turning of a wheel, so that the valve 17 presents an opening of sufficient dimensions for allowing the hole-making tool and the drill bit to be inserted down through the valve and towards the mantle surface of the pipeline 57 in the area that faces the opening 14. The axial movement of the hole-making tool is provided by displacing the driving device 5 in a direction towards the pipeline along the support 30. By means of the holding member 31 for the driving device with its operating device 66, the drill bit 37 is applied with a certain force against the mantle surface of the pipeline, thereby activating the driving device 5 for rotation of the drive shaft 39 until the circular hole 56 has been formed. In a manner which is known, the cut off section 37 may remain in the drill bit and be carried away in a return motion during which the driving device 5 is raised, so that the drill bit resumes the retracted position shown in FIG. 4. Due to the fact that the driving shaft 39 or, where appropriate, its driving shaft sleeve is sealingly fitted against the seals 28, 29 of the pipe socket, whereby the flushing valve 36 is also maintained closed, the pipe socket 2 still forms a closed space when the closing valve 17 is held open. Both the inner part 11 and the outer part 16 of the pipe socket are thus maintained under the same fluid pressure as in the pipeline 57. Depending on the degree of sealing a fluid may, to a high or a low degree, flow into the space 24 in the outer part 16 of the pipe socket, but is prevented to a varying degree by the quantity of air which remains in the space and which is compressed by the fluid pressure. In practice, it is not always necessary to obtain a 100% sealing, for example in the channel 27 around the shaft 39.

After the hole-making tool 3 has been retracted, the operator ensures that the closing valve 17 is completely shut. Thereafter, the flushing valve 36 is suitably opened for relieving of the pressure in the space in the outer part 16 of the pipe socket. This may thereafter once again be removed, whereby a small amount of fluid pours out. The hole-making tool 3 is disconnected from the chuck 33 and is pulled out from the outer part 16 of the pipe socket and is replaced by the blocking means 42, which is inserted in the same way as the hole-making tool 3 in the part 16 so that its drive shaft 42 is inserted from the inside through the duct 27 and is mounted in the chuck 33 with the end part 45 of the drive shaft.

Figure 5:
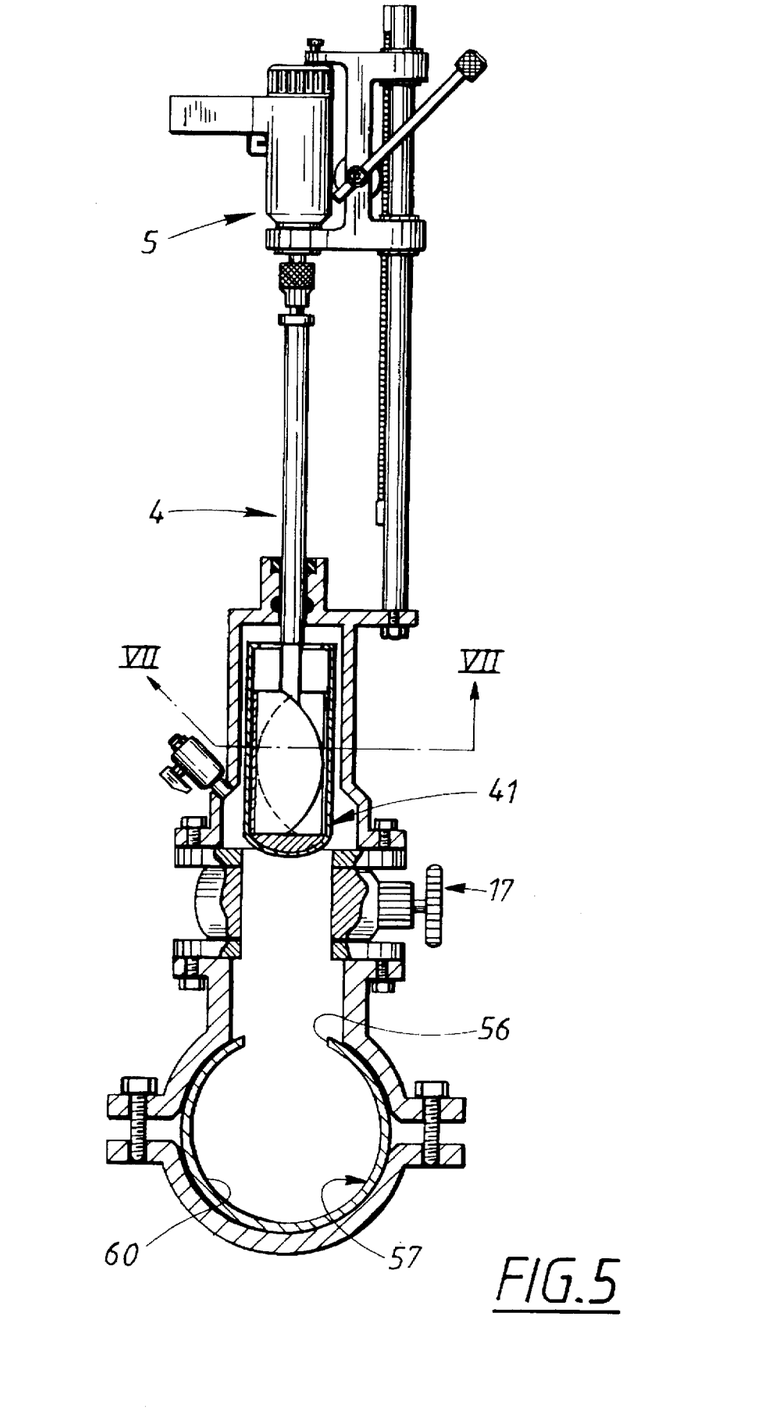
FIG. 5 shows a cross-section of the device according to FIGS. 1 to 4, prepared for the insertion of a blocking means according to the invention.

The outer end 16 of the pipe socket is thereafter once more mounted to the outer flange 21 of the closing valve 17 by means of the screw joint 64, see FIG. 5. Devices which are not shown make sure that the blocking means 4 reaches, and is maintained in, a predetermined fixed rotary position so that the blocking means is expanded during the closing movement in a direction across the longitudinal direction of the pipeline 57. This fixing of the position may be carried out by a control outside or inside of the pipe socket 2. It is ensured that the flushing valve 36 once again is kept closed and the closing valve 17 is kept open. The inner parts of the valve are shown completely schematically in a partly cut section in FIG. 5 in order to illustrate the completely open duct within the pipeline. Thereafter, the blocking means 4 is inserted down through the valve 17, through the duct 12, the produced hole 56 in the pipeline and into this until the body of the blocking means with its lower part 61 is in contact with the bottom of the line or its inner circumference opposite the produced hole 56. In a way which corresponds to the making of the hole, the pipe socket forms together with the inner parts of the clamp and the pipeline a closed unit, the inner parts of which are essentially sealed from the environment.

Figure 6:
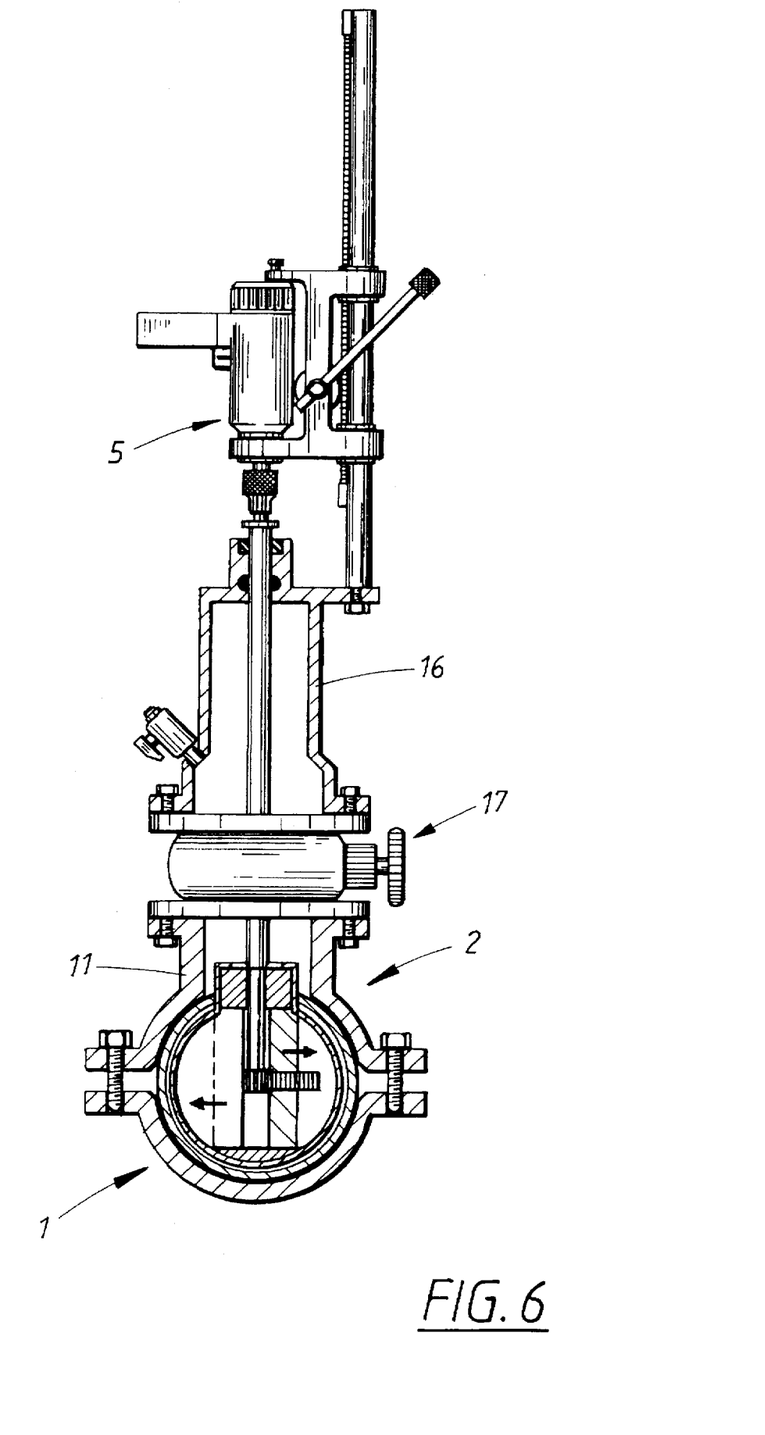
FIG. 6 shows a corresponding view with the device according to FIGS. 1 to 5 in a blocking position.

When the blocking means is fitted in the fluid line and its rotary position has been assured by a position control and some kind of holding, for example by the operating sleeve 43 or the body 41, the driving device 5 is activated for rotation of the operating shaft 44. Via the transmission gearing 46, the blocking sliding elements 47, 48 are forced to move in opposite directions, whereby the elastic cover 51 is stretched as shown in FIG. 8 until the blocking sliding elements with their arc-shaped circumferences 58, 59 sealingly fit against the inner circumference of the pipeline, whereby a fluid blocking takes place in the present zone of the pipeline, see FIG. 6. The blocking sliding elements are arranged together with the body 41 around the entire inner circumference of the pipeline in such a way that a complete fluid blocking occurs against a continued flow downstream from the blocking position. When the blocking device is placed in the blocking position, the body and the elastic cover 51 assure also that a sealing is accomplished around the hole 56 so that any flow via the hole does not occur. As is apparent from FIG. 6, this sealing is assured due to the fact that the body 41 with its cover 51 protrudes out of the hole 56 with a cylindrical part 69.

By blocking the flow in the fluid pipeline 57, the pipeline system downstream of the blocking position may be emptied from fluid and necessary work may be carried out. When the work is finished, the blocking means is activated for release of fluid, which takes place by reversing the rotary direction of the operating shaft 44, which may be carried out by means of a built-in reverse gear in the driving device 5 or by a not shown gear in the operation shaft 42. In this manner, the blocking sliding elements 47, 48 are retracted from their positions shown in FIG. 8 to their positions shown in FIG. 7. The body 41 of the blocking means has thereby gained such dimensions that the blocking means may be inserted through the opening 56 by turning the lever 66 and thereby raising the driving device 5 and the operating shaft 42, until the body 41 has passed the closing valve 17 and been placed in the position shown in FIG. 5.

In this regard, the closing valve 17 is readjusted by activating the operating means 65 to the closed position, after which the flushing valve 36 once again is opened in order to unload the pressure in the outer part 16 of the pipe socket, which thereafter may be released through loosening of the screw joint 64.

Figure 10:
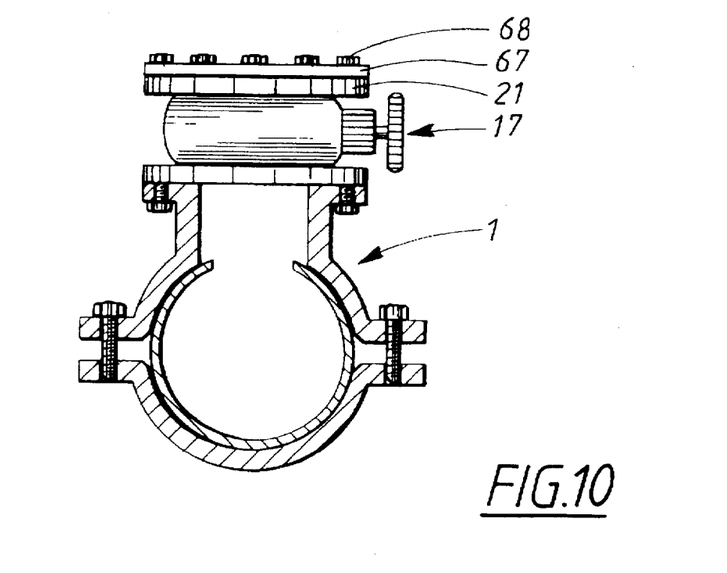
FIG. 10 shows a cross-section of the remaining device after the blocking is finished.

In a final stage for restoring after the blocking is finished, a cover plate 67 is fixed to the outer flange 21 of the valve, and is screwed on by means of a screw joint 68, preferably with an intermediate washer even if the valve 17 is assumed to be tight.

Figure 11:
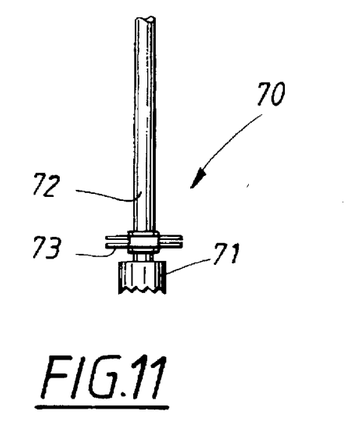
FIG. 11 shows an alternative embodiment of a part.
Figure 12:
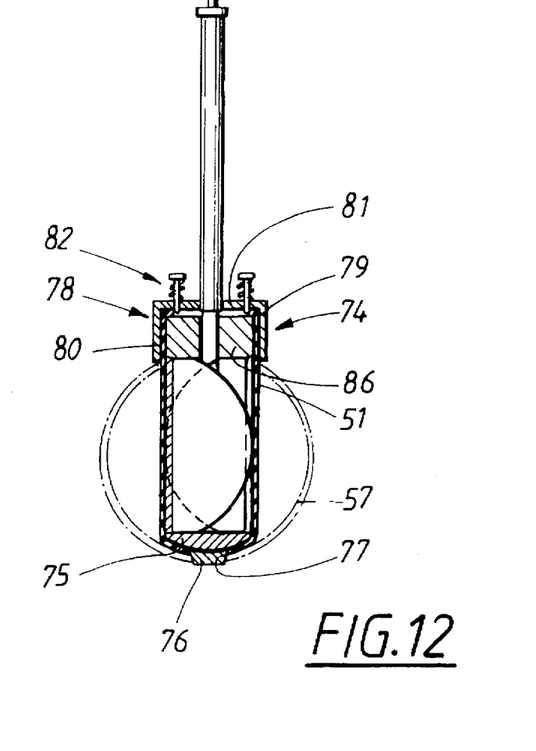
FIG. 12 shows a longitudinal cross-section of a blocking means forming part of the invention, in a second embodiment.
Figure 13:
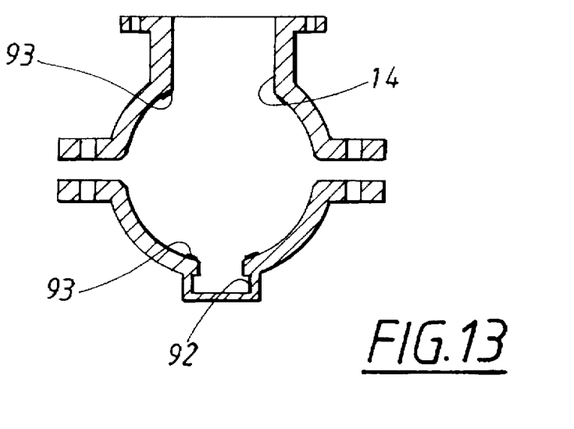
FIG. 13 shows a clamp member forming part of the invention, in a second embodiment.

FIGS. 11, 12 and 13 show elements forming part of the device according to the invention in a second embodiment. FIG. 11 shows a partly broken view of a hole-making tool 70 in the form of a drill bit 71 with a diameter which is less than the drill bit according to FIG. 2 and which is intended to produce a second hole, which will be described in greater detail below. On the same shaft 72, there is also arranged a deburring tool 73 in the form of a grinding wheel with a diameter which is adapted to the diameter of the hole 56 in order to make possible a deburring, especially of the edge of the hole towards the inner parts of the pipe 57.

By means of the deburring, there is a smaller risk that the elastic cover 51 on the blocking means is damaged against burred edges which are formed when the hole is made.

FIG. 12 shows the blocking means, here indicated by 74, in a second embodiment which essentially corresponds to the first embodiment, which means that only the differing parts will be described here. In this example, the lower part of the blocking means 74 comprises support means in the form of a stud 76 which is downwardly protruding from its fixed base portion 75 and which extends through a hole in the elastic cover 51. The stud 76 is adapted to be inserted into a hole 77 in the pipeline 57, which is indicated with dot-dash lines in FIG. 12. This hole 77 is formed by means of the drill bit 71, centrally in relation to the symmetry line 34 and opposite the hole 56 with a smaller diameter than the hole 56, in order to make possible that the hole-making tool according to FIG. 11 may be inserted through the hole 56 which was first produced. The conical shape of the stud 76 gives a certain guiding function to the hole 77. By means of the lateral support of the stud 76 to the edge portion of the hole 77, the upper portions of the means is to a great extent unloaded from bending moment being generated by the dynamic forces of the flow.

Figure 14:
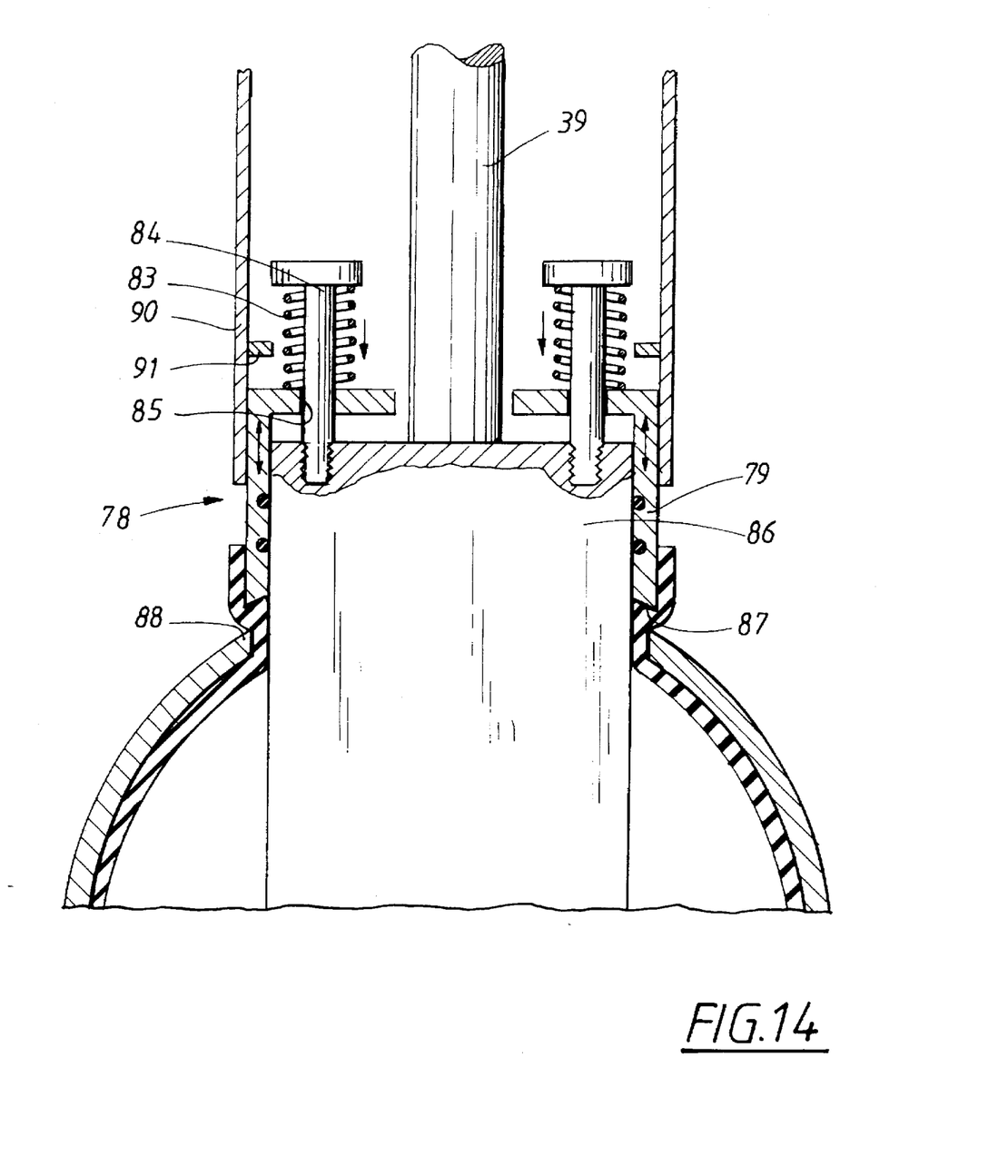
FIG. 14 shows, on a larger scale, a partial sectional view of the embodiment according to FIG. 12, however somewhat modified.

According to this second embodiment, the blocking means is also provided with an upper sealing device 78 which is shown in FIG. 12 and on a larger scale in FIG. 14. The sealing device 78 consists of a sealing ring 79 in the form of an upside-down lid with a cylindrically downwardly protruding wall portion 80 and, for example, a plane gable portion 81. The lid is axially moveable against the action of a spring device 82. In the shown example, it consists of a number of, for example four, compression springs in the form of helical springs 83 with one screw each 84 acting as guiding and abutment. The screws 84 extend through holes 85 in the gable portion 81 of the sealing ring 79 and are fastened to a fixed upper portion 86 of the body of the blocking means.

In the embodiment according to FIG. 12, the elastic cover 51 extends inside of the sealing ring 78 which thereby is sealingly maintained against the upper portion 86 of the body. Through the action of the spring device 82, the vertical position of the sealing ring in relation to the body is adapted to the outer diameter of the pipeline 57, which by means of this may vary within certain tolerances.

In the modified embodiment according to FIG. 14, the elastic cover 51 extends on the outside of the sealing ring 79, by means of which a particularly tight seal is obtained due to the fact that the circularly extending edge portion 87 of the sealing ring presses a portion of the elastic cover 51 against the edge portion 88 of the hole 56. In this regard, two O-rings 89 assure a seal between the inside of the sealing ring 79 and the upper portion 86 of the body. A sealing ring 90 with a supporting flange 91 locks the elastic cover 51 in its upper portion so that it will not be brought downwardly. The locking ring 90 also provides support and takes up a bending moment due to loads originating from the flow in the pipeline.

FIG. 13 shows the clamp 1 in a second embodiment, adapted to the blocking means 74 according to FIG. 12. The difference to the part according to FIG. 1 is that its abutment member 8 is, at its lower portion opposite the opening 12, provided with a bowl-shaped portion 92 which for example is cylindrical with a diameter which slightly exceeds the diameter of the drill bit 71. In this manner, it is permitted during sawing that the drill bit 71 be lowered into the part 92, which may also accomodate the sawn-out portion of the pipeline, unless it is not caught and carried away by the drill bit when this is removed. Around the hole-shaped portion 92 on the inside of the abutment portion 8, there is arranged a seal 93 which extends circularly, which is also the case at the opening 14 of the portion.

The invention is not limited to the embodiments which have been described above and in the drawings, but may be varied within the scope of the appended claims. For example, the clamp 1 may be shaped with a thin support loop which forms a means for holding on during the making of holes and during blocking. However, a seal around the locations where holes have been produced must be assured. The guiding and operation of the sliding elements may be carried out in another way.

I claim:

1. A device for blocking flow in a pipeline under pressure, comprising:

(a) a clamp member for encasing a section of a mantle surface of the pipeline;

(b) a pipe socket with a valve switchable between an open and closed position;

(c) a hole-making tool for producing holes in the mantle surface during sealing between the tool and the pipe socket, and (d) a blocking assembly for inserting through the produced hole and for expanding in the pipeline for the purpose of blocking flow in the pipeline, said blocking assembly comprising (1) a body having a cross-sectional dimension less than the cross sectional dimension of the hole;

(2) a support member guided in said pipe socket for supporting said body, said support member having an operating element rotatably mounted therein;

(3) two sliding elements carried for reciprocating motion by guides in said body; and (4) a transmission gear comprising two rack means cooperatively associated with respective sliding elements, and at least one gear mounted in said body and engaged with said rack means for transmitting rotary motion of said operating element to reciprocating motion of said sliding elements in opposite respective directions between an open position, in which said sliding elements are retracted into said body, and an expanded position, in which said sliding elements extend from said body, causing a portion of said sliding elements to create a seal with an inner surface of the pipeline to substantially block flow therethrough.

2. A device as claimed in claim 1, wherein said pipe socket comprises:

an inner part; and and outer, releasable part with an outer opening for sealingly inserting a drive shaft of the hole-making tool during the hole-making stage and sealingly inserting the support member of the blocking assembly;

wherein said valve is located between said inner and outer parts of said pipe socket and is adapted to seal said inner part when said outer part is removed or is opened.

3. A device as claimed in claim 2, further comprising::

a driving device; and a driving device support attached to said outer portion of said pipe socket for supporting said driving device, whereby a rotary output shaft of said driving device is on a longitudinal axis of said pipe socket, and said driving device is movable to various positions along said longitudinal axis.

4. A device as claimed in claim 3, wherein said hole-making tool is releasably attached to said output shaft of said driving device so that a tool portion of said hole-making tool, in a retracted position, is located in said outer potion of said pipe socket and, in an advanced position, may be pressed against the mantle surface of the pipeline.

5. A device as claimed in claim 2, wherein said body of said blocking assembly is adapted to be accommodated in said outer portion of said pipe socket with said closing valve closed, and to be inserted through said closing valve and through the produced hole in the pipeline with said valve being open, said body further adapted to make contact with the inner circumference of the pipeline.

6. A device as claimed in claim 1, wherein at least a portion of said sliding elements, when in said expanded position, are covered by an elastic, highly expandable sealing cover for sealing against said inner surface of said pipeline.

7. A device as claimed in claim 1, wherein said support member comprises a position control means and a shaft sleeve fixed to said body which is adapted, by said position control means, to establish a rotary position of said body in relation to the pipeline.

8. A device as claimed in claim 1, wherein a lower part of said blocking assembly is provided with a lower support stud adapted to be inserted into a second produced hole in the pipeline and to form a support against an edge portion of said second produced hole to support said blocking assembly against a bending moment created by the pressure in the pipeline, said second hole being positioned in front of and opposite the first hole.

9. A device as claimed in claim 8, wherein at least a portion of said sliding elements, when in said expanded position, are covered by an elastic cover for sealing against said inner surface of said pipeline, and wherein said lower support stud protrudes through a hole in said elastic cover.

10. A device as claimed in claim 9, wherein said stud is conical and externally tapered.

11. A device as claimed in claim 8, wherein said clamp member comprises a bowl-shaped space for allowing insertion of said hole-making tool in order to produce the second hole.

12. A device as claimed in claim 1, wherein said blocking assembly comprises an upper sealing device for sealing around the produced hole, said sealing device comprising a lid having a downwardly protruding collar and a spring device for urging said lip to an operating position against an edge portion of the hole.

13. A device for blocking flow in a pipeline under pressure, comprising:

(a) a clamp member for encasing a section of a mantle surface of pipeline;

(b) a pipe socket with a valve switchable between an open and closed position;

(c) a hole-making tool for producing first and second holes in the mantle surface during sealing between the tool and the pipe socket, said second hole being positioned in front of and opposite said first hole; and (d) a blocking assembly for inserting through the first produced hole and for expanding in the pipeline for the purpose of blocking flow in the pipeline, said blocking element comprising (1) a body having a cross-sectional dimension less than the cross sectional dimension of the first produced hole;

(2) a support member guided in said pipe socket;

(3) two sliding elements carried by said body, said sliding elements being adjustable from outside the device through said support member between an open position, in which they are retracted into said body, and an expanded position, in which said sliding elements extend from said body, causing a portion of said sliding elements to create a seal with the inner surface of the pipeline to substantially block flow therethrough; and (4) a lower support stud provided in a lower part of said blocking means adapted to be inserted into said second produced hole and to form a support against an edge portion of the second produced hole to support said blocking assembly against a bending moment created by the pressure in the pipeline.

14. A device as claimed in claim 3, wherein said sliding elements arc covered by an elastic cover, and wherein said lower support stud protrudes through a hole in said elastic cover.

15. A device as claimed in claim 14, wherein said stud is conical and externally tapered.

16. A device as claimed in claim 13, wherein said clamp member comprises a bowl-shaped space for allowing insertion of said hole-making tool in order to produce the second hole.

* * * * *

UNITED STATES PATENT AND TRADEMARK OFFICE
CERTIFICATE OF CORRECTION

PATENT NO.    : 5,676,171
DATED         : October 14, 1997
INVENTOR(S)   : Heed

It is certified that error appears in the above-identified patent and that said Letters Patent is hereby corrected as shown below:

Column 1, line 11, "from for example" should read --from, for example,--

Column 3, line 40, "4" should read --9--.

Column 5, line 31, "streched" should read --stretched--.

Column 8, line 67, "of pipeline" should read --of the pipeline--.

Column 10, line 10, "3" should read --13--.

Column 10, line 11, "arc" should read --are--.

Signed and Sealed this

Twenty-seventh Day of January, 1998

BRUCE LEHMAN

Attest:

Attesting Officer

Commissioner of Patents and Trademarks